United States Patent [19]

Kobayashi et al.

[11] Patent Number: 5,712,963

[45] Date of Patent: Jan. 27, 1998

[54] PRINTER CONTROL SYSTEM INCLUDING WHITE ENLARGED LINE MEMORY FOR STORING EXPANDED WHITE PRINT PIXEL SIGNALS AND BLACK ENLARGED LINE MEMORY FOR STORING EXPANDED BLACK PRINT PIXEL SIGNALS

[75] Inventors: Shinya Kobayashi, Mito; Kunio Sato, Hitachi; Yasuo Kikuchi, Katsuta, all of Japan

[73] Assignees: Hitachi, Ltd.; Hitachi Koki Co., Ltd., both of Tokyo, Japan

[21] Appl. No.: 771,272

[22] Filed: Dec. 20, 1996

Related U.S. Application Data

[63] Continuation of Ser. No. 297,568, Sep. 1, 1994, abandoned.

[30] Foreign Application Priority Data

Sep. 1, 1993 [JP] Japan ................................. 5-217186

[51] Int. Cl.$^6$ .................................................. G06F 15/00
[52] U.S. Cl. .................................... 395/109; 358/447
[58] Field of Search ..................... 395/101, 106, 395/109, 116, 128, 129, 132, 133; 358/447, 448, 454, 456, 516, 529, 530, 532, 534; 382/165, 167, 254, 255, 266, 268, 269

[56] References Cited

U.S. PATENT DOCUMENTS

| | | | |
|---|---|---|---|
| 4,543,611 | 9/1985 | Kurahayashi | 358/260 |
| 4,544,264 | 10/1985 | Basseti et al. | 355/14 R |
| 5,064,258 | 11/1991 | Inouuchi et al. | 350/3.71 |
| 5,134,495 | 7/1992 | Frazier et al. | 358/298 |
| 5,163,123 | 11/1992 | Kadono | 395/116 |
| 5,270,827 | 12/1993 | Kobayashi et al. | 358/298 |
| 5,327,260 | 7/1994 | Shimomae et al. | 358/448 |
| 5,347,298 | 9/1994 | Gouita | 346/108 |
| 5,359,434 | 10/1994 | Nauao et al. | 358/481 |
| 5,396,584 | 3/1995 | Lee et al. | 395/132 |

FOREIGN PATENT DOCUMENTS

| | | |
|---|---|---|
| 63-67073 | 3/1988 | Japan. |
| 3-33769 | 2/1991 | Japan. |

*Primary Examiner*—Edward L. Coles, Sr.
*Assistant Examiner*—Gabriel Garcia
*Attorney, Agent, or Firm*—Antonelli, Terry, Stout & Kraus, LLP.

[57] ABSTRACT

A printer control system for controlling a print characteristic of a printer for printing a print pixel signal synchronized to horizontal lines of an image. The print pixel signal has an arbitrary horizontal resolution and includes white print pixel signals representing white pixels of the image and black print pixel signals representing black pixels of the image. The printer control system controls the print characteristic of the printer in accordance with a type of the image and includes a white enlarged line memory for receiving the print pixel signal and storing the print pixel signal at timing points spaced a predetermined time apart after expanding any portion of any white print pixel signal in the print pixel signal falling between two adjacent ones of the timing points and having a duration less than the predetermined time to have a duration equal to the predetermined time without expanding any portion of any black print pixel signal in the print pixel signal, and a black enlarged line memory for receiving the print pixel signal and storing the print pixel signal at timing points spaced a predetermined time apart after expanding any portion of any black print pixel signal in the print pixel signal falling between two adjacent ones of the timing points and having a duration less than the predetermined time to have a duration equal to the predetermined time without expanding any portion of any white print pixel signal in the print pixel signal.

7 Claims, 16 Drawing Sheets

1101 BEAM   1501 BEAM   1502 BEAM   COMPOSITE BEAM

CONVENTIONAL   THIS EMBODIMENT

CONVENTIONAL    THIS EMBODIMENT

PRINTER CONTROL SYSTEM INCLUDING WHITE ENLARGED LINE MEMORY FOR STORING EXPANDED WHITE PRINT PIXEL SIGNALS AND BLACK ENLARGED LINE MEMORY FOR STORING EXPANDED BLACK PRINT PIXEL SIGNALS

CROSS-REFERENCE TO RELATED APPLICATION

This is a continuation of application Ser. No. 08/297,568 filed on Sep. 1, 1994, now abandoned.

BACKGROUND OF THE INVENTION

The present invention relates to a printer for sequentially printing an image signal received from a computer or the like, and more particularly to a printer control system for improving image quality by means of image processing.

In a conventional information printing system, a signal from a controller in a computer or the like is received by a printer control system, and the signal from the printer control system is manipulated through exposing, developing and fixing processes in a printer to print out information on printing paper. As described in Japanese Patent Application Laid-Open No. 63-67073 (1988) and Japanese Patent Application Laid-Open No. 3-33769 (1991), the processing of a printer control system comprises storing several lines of sequentially transmitted print pixel data in a line memory for a predetermined time, recognizing an image pattern of pixels to be printed from the stored data through image processing, and producing a print control signal depending on the image pattern. In the printer, although a laser beam is controlled with ON-OFF control according to the print pixel signal, the amount of light produced during the ON period is controlled depending on the print control signal generated by the printer control system to obtain an output image having a high image quality.

In the printer control system, although several lines of print pixel data are stored in a line memory for a predetermined time, the signal has to be stored accurately pixel by pixel at that time. If the print pixel signal is stored in the line memory inaccurately, the image quality is substantially degraded by the appearance of a fluctuation on the edge portion, i.e. so-called jitter or low frequency streaking and so-called moire, in the print image. Therefore, in the conventional system, a pixel synchronization signal for indicating the delimiter of the print pixel signal is transmitted together with the print pixel signal. In the printer control system, the print pixel signal is written in or read out from the line memory in synchronism with the pixel synchronization signal to realize accurate storing or reading.

However, in recent years, it has become a focus of attention to provide a printer which inherently has a high resolution in the horizontal (main scanning) direction, and so a technique to improve the horizontal resolution of the print pixel signal output from the controller has been widely used. In this case, both the capacity and the processing speed required for the line memory in the printer control system have been increased, which leads to an increase in the cost and in the complexity of the circuit. For the purpose of accommodating a wide range of users' needs and various print images, one often encounters absence of the pixel synchronization signal from the controller and the incapability of specifying the synchronization frequency of the print pixel signal. Therefore, it becomes difficult to store the print pixel signal in the line memory accurately. Since the role of the print control signal is to correct the print characteristic of the printer, the horizontal resolution required for the correction, that is, the capacity required for the line memory, is determined according to the printer itself and the contents of correction. Therefore, even when the print pixel signal has a high resolution, there is no change in the horizontal resolution required for the correction so long as the printer and the contents of the correction are not changed.

There is a need for a printer control system having a line memory in which the capacity and the processing speed are independent of the resolution of the print pixel signal. However, when an attempt is made to realize this objective by using a conventional system, the image quality is substantially degraded by appearance of jitter and moire in the print image, as described above.

SUMMARY OF THE INVENTION

An object of the present invention is to provide a printer control system for a laser printer, which is capable of correcting the print characteristic of the printer in accordance with a high resolution of the print pixel signal to be input while using a low resolution line memory.

The object of the present invention can be attained by providing a printer control system with means for generating a line memory synchronization signal having a phase in synchronism with a horizontal synchronization signal, a line memory for writing a white print pixel signal which is shorter than the interval of writing in the line memory by expanding it to the writing interval in the line memory, a line memory for writing a black print pixel signal which is shorter than the interval of writing in the line memory by expanding it to the writing interval in the line memory, means for generating at least one image recognition signal by recognizing an image through selecting and using the output from either of the above line memories, and means for calculating a logical product or logical sum of the image recognition signal and the print pixel signal.

The printer control system generates a line memory write-in synchronization signal having a frequency required to obtain the resolution required for printing in the printer. Since the write-in synchronization signal is generally of lower frequency, that is, of lower resolution, than that of the pixel synchronization signal of the print pixel signal, the line memory in accordance with the present invention can be smaller in capacity and slower in processing speed than that of a conventional system in which the pixel synchronization signal is also used as the write-in synchronization signal.

In general, when a print pixel signal having a high resolution is stored In a line memory having a low resolution, a defect occurs in the stored information, and the ability of the printer to control the process accurately decreases. However, since, in most cases of printer control, a fine region or a continuous region of a white or black signal is mainly enhanced, it is sufficient if the following two signals are not lacking from the information stored in the line memory.

Signal 1): a short white signal in an otherwise continuous blade signal. If the signal 1) is lacking, the white fine region to be enhanced cannot be enhanced, or the black continuous region not to be enhanced is incorrectly enhanced.

Signal 2): a short black signal in an otherwise continuous white signal. If the signal 2) is lacking, the black fine region to be enhanced cannot be enhanced, or the White continuous region not to be enhanced is incorrectly enhanced.

When a print pixel signal having a high resolution is stored in a line memory having a low resolution, in some cases the signal 1) is lacking or in other cases the signal 2) is lacking due to information absent at the time of storing. This is caused by a shift between the print pixel signal and the line memory write-in synchronization signal. In the present invention, the signal 1) can be maintained with means for writing a white print pixel signal which is shorter than the interval of writing in the line memory by expanding it to the writing interval in the line memory, and the signal 2) can be maintained with means for writing a black print pixel signal which is shorter than the interval of writing in the line memory by expanding it to the writing interval in the line memory.

The image recognition required signal 1) is obtained from the image recognition signal using the signal stored in the former line memory. The image recognition required signal 2) is obtained from the image recognition signal using the signal stored in the latter line memory. Therefore, it is possible to recognize the image to be enhanced using means for selecting and utilizing a suitable output from either of the line memories and generating at least one of the image recognition signals. However, since the image recognition signal becomes coarse in resolution, jitter and moire are caused in the print image when the print control signal is used as it is to enhance the output image. If the print control signal is generated as a finishing processing by calculating the logical product and the logical sum of the image recognition signal and the print pixel signal, an image print having a high resolution can be obtained while maintaining the print control effect, and the object described above can be attained.

DETAILED DESCRIPTION OF THE PREFERRED EMBODIMENTS

Figure 1:
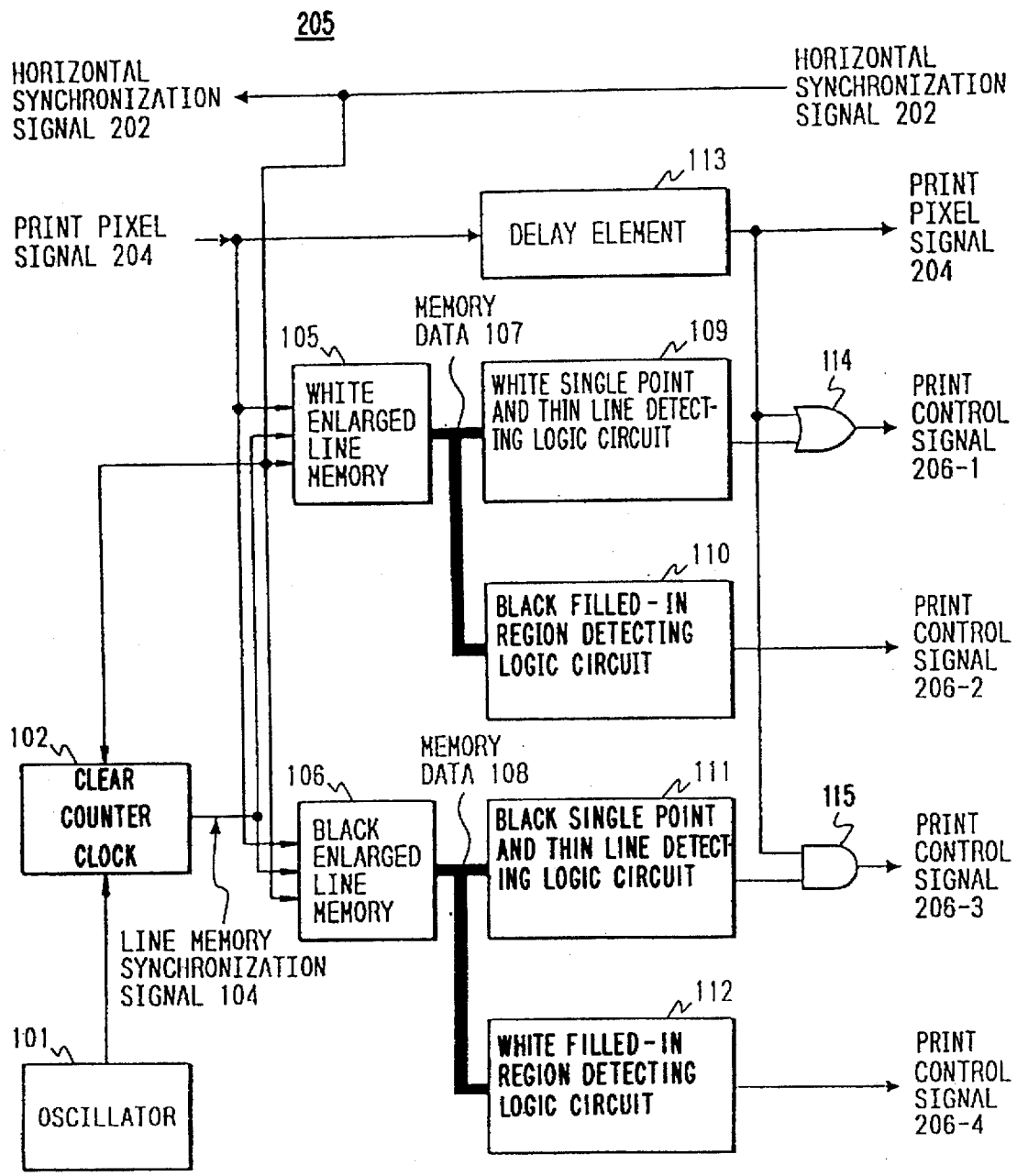
FIG. 1 is a schematic block diagram showing the structure of a printer control system in accordance with the present invention.

An embodiment according to the present invention will be described below, referring to FIG. 1 through FIG. 12(2). FIG. 2 shows the overall configuration of a system according to the present invention. A printer 207 in this embodiment is a laser printer such as that shown in FIG. 11(a). The structure of the laser printer includes, as shown in FIG. 11(a), a charger 15 for uniformly charging a rotating photosensitive member 1103, a semiconductor laser 1101 for forming an electrostatic latent image by irradiating a laser light beam 13 on the surface of said photosensitive member which has been charged uniformly, a rotating polygonal mirror 1102 for scanning the light beam on the photosensitive member 1103 in the horizontal direction, an exposing optical system composed of a lens system 11 and 12 for adjusting the focus of light incident from said rotating polygonal mirror on the surface of the photosensitive member, a developing unit 20 for developing said electrostatic latent image with toner, a transfer unit 16 for transferring said developed toner image to a printing medium 18, a fixing unit 17 for fixing the unfixed toner image on the printing medium 18, and a cleaner 21 for cleaning any remaining toner on the rotating photosensitive member which was not transferred to the printing medium 18. Although in this figure there are shown only an exposing controller 10 for controlling the amount of light produced by the semiconductor laser 1101 and a fixing controller 19 for controlling the fixing temperature of the fixing unit, there may be provided control means for the charger, the developing unit, the transfer unit, and the cleaner, so as to control the operation of each of these units depending on their condition. However, there is no need to provide a respective controller for each unit, as described above, since the controllers may be integrated into one controller or the controllers may be contained in a printer control system 205 shown in FIG. 2, as will be described later. FIG. 11(b) shows the scanning of the laser beam on the photosensitive member. The laser beam from the semiconductor laser 1101 is reflected in the horizontal (main scanning) direction by the rotating polygonal mirror 1102 so as to scan the laser beam on the rotating photosensitive member 1103. At this time, a horizontal synchronization signal 202 shown in FIG. 2 is generated by a beam detector 1104 composed of a photodetector. In this embodiment, it is assumed that the printer 207 has a horizontal scanning speed of v (m/s), a spacing between scanning lines of d (m), and therefore a vertical resolution of 1/d (dot/m). Referring again to FIG. 2, a controller 201 receives the horizontal synchronization signal 202 from the printer 207 and outputs a print pixel signal 204, accurately in synchronism with the horizontal synchronization signal 202, to the printer control system 205. It is also assumed that, concerning half-tone printing, the print pixel signal 204 in this embodiment is a binary image signal composed of white and black portions, and concerning the resolution in the horizontal direction, the resolution is high as described above. In accordance with the present invention, there is no limitation on upgrading the horizontal resolution of the print pixel signal 204. The structure of the printer control system 205 does not need to be changed even when there are many different horizontal resolutions. The printer control system 205 outputs the print pixel signal 204 and at the same time outputs many kinds of print control signals 206 to the printer 207 in order to correct the print characteristic of the printer 207. As a result, the printer can provide an output image having a high quality.

Figure 2:
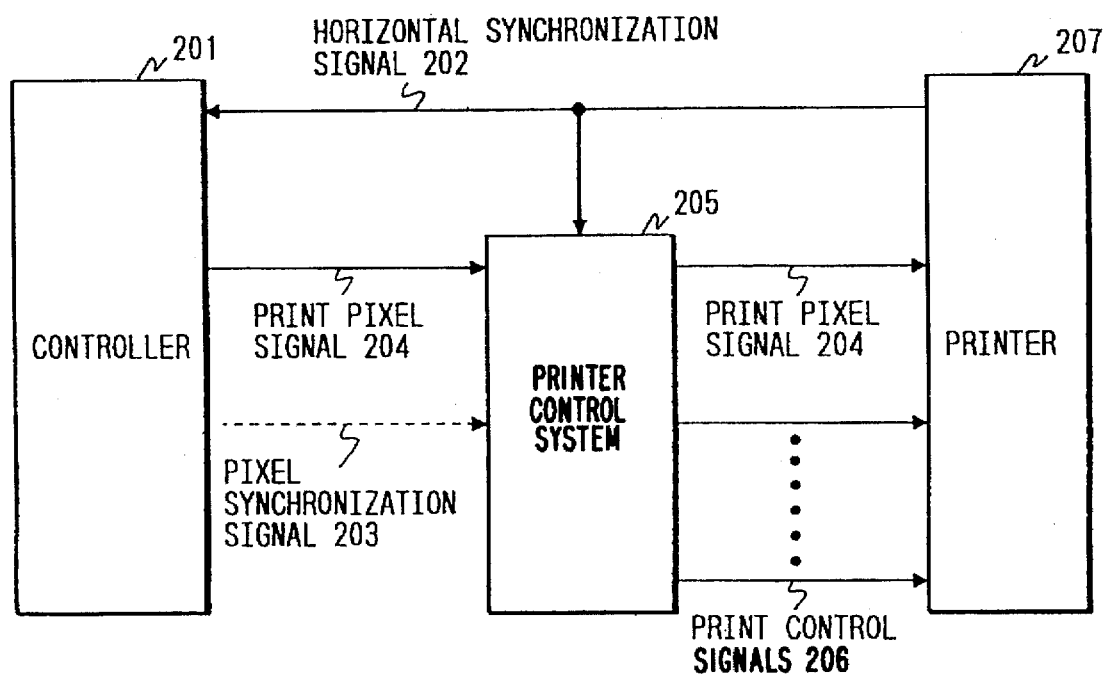
FIG. 2 is a schematic block diagram showing the structure of a laser printer system in accordance with the present invention.

FIG. 1 shows an embodiment of the printer control system 205 in FIG. 2. A counter 102 counts a high frequency clock signal from an oscillator 101 and is cleared by the horizontal synchronization signal 202 generated by the beam detector 1104 in the printer 207, and outputs a line memory synchronization signal 104 which corresponds to a signal obtained by dividing the high frequency clock signal and is synchronized with the horizontal synchronization signal 20a. The line memory synchronization signal 104 is a synchronization signal which is used to control the writing of the print pixel signal into a line memory according to the present invention and the reading out of the print pixel signal from the line memory. The higher the frequency of the line memory synchronization signal is, the higher will be the horizontal resolution during printing. In the embodiment, the frequency f (Hz) of the line memory synchronization signal 104 is set as f=V/d in order to provide a resolution of 1/d (dot/m) in the horizontal direction which is comparable to the vertical resolution. However, since the frequency can be set arbitrarily in accordance with the present invention, the frequency does not need to be in agreement with the print pixel signal 204 having a high resolution as in a conventional system. It is sufficient that the frequency provide a resolution which is high enough to correct the print characteristic of the printer 207. For the purpose of explanation, the horizontal resolution of the print pixel signal 204 in this embodiment is set at 3/d (dot/m), i.e. three times the resolution of the line memory. The print pixel signal 204, having a high resolution, is written in a white enlarged line memory 105 and a black enlarged line memory 106, which are provided in accordance with the present invention, in response to the horizontal synchronization signal 202 and the line memory synchronization signal 104. Since the print pixel signal 204 which has been written in the line memory 105 or 106 is low in resolution, this signal is hereinafter referred to as memory data 107 or 108, respectively, in order to distinguish it from the print pixel signal 204. The reason why the resolution thereof becomes low is that, as will be described later, a flip-flop circuit is provided, which flip-flop circuit is reset upon detecting the print pixel signal so as to store the state reset by the line memory synchronization signal to the line memory, and a signal having a resolution higher than the memory density of the line memory is lowered to a low resolution so as to be stored in the line memory using the flip-flop circuit.

Figure 3:
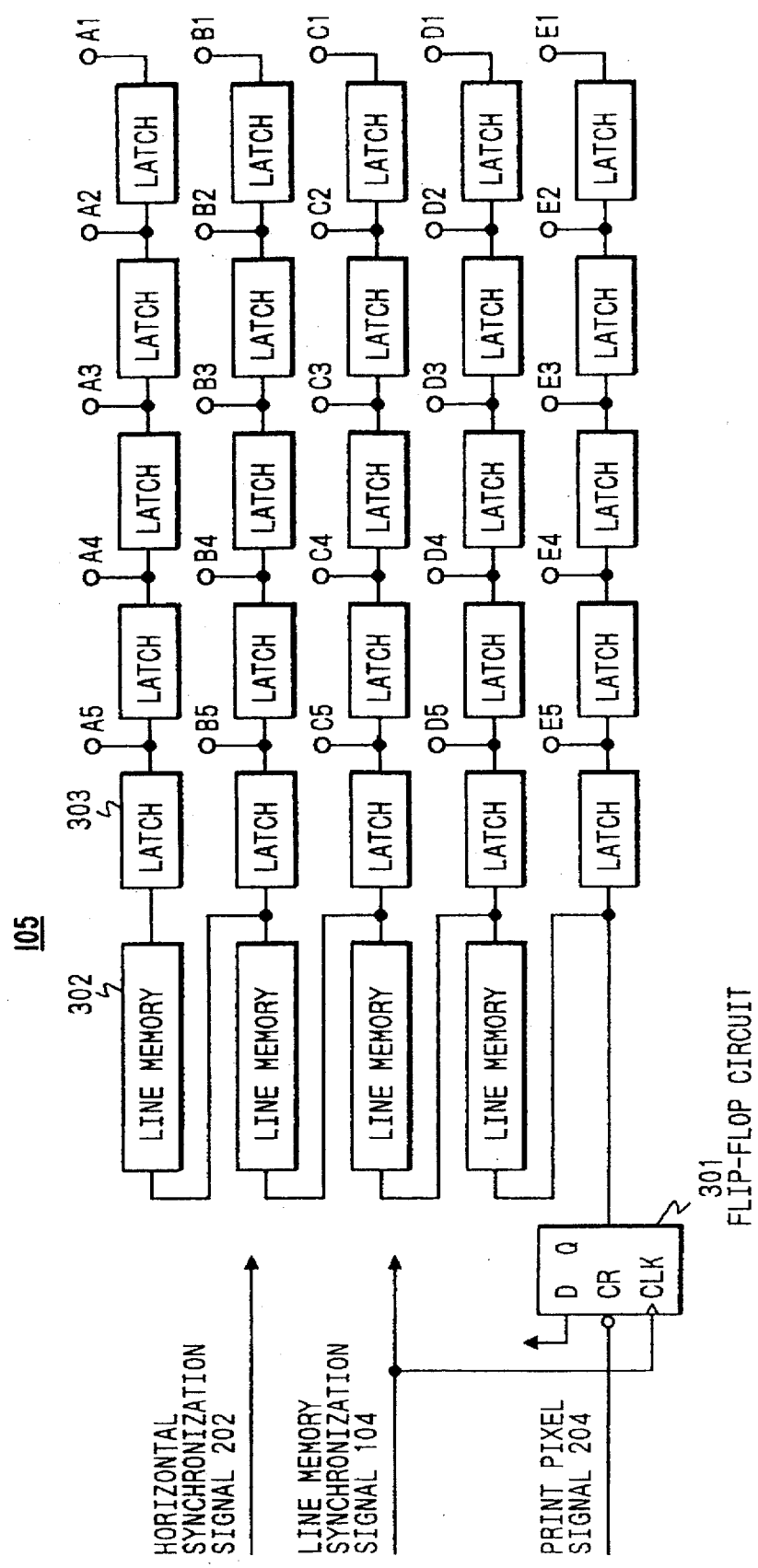
FIG. 3 is a schematic block diagram showing the structure of a white enlarged lane memory in accordance with the present invention.

FIG. 3 shows the structure of the white enlarged line memory 105. This line memory according to the present invention is characterized by provision of a flip-flop circuit 301 ahead of a conventional line memory composed of a line memory 302 capable of storing four lines of data and twenty-five latches 303. The line memory 302 and the latches 303 read the print pixel signal 204 in synchronism with the line memory synchronization signal 104, that is, the signal 104 establishes the timing for reading-in. In a case of setting the resolution in the main (horizontal) direction for the print pixel signal 204 at a high resolution, when there is a white print pixel signal 204 shorter than the cycle of the line memory synchronization signal 104, sometimes the white print pixel signal cannot be stored in a conventional line memory. In a case where the printer 207 is controlled in such a way that a black filled-in region is detected and the inside of the black filled-in region is printed strong, when a short white print pixel signal 204 inside a black filled-in region formed by a user is not stored in the line memory, the portion is printed strong as a black filled-in region and the short white print pixel signal 204 disappears. In this embodiment, no matter how short a white print pixel signal 204 is compared to the period of line memory synchronization signal 104, the white print pixel signal can be trapped, since the flip-flop circuit 301 is reset or cleared to 0 by the white print pixel signal. When the next line memory synchronization signal 104 is received, the reset state of 0 of the flip-flop circuit 301 is written in the white enlarged line memory 105. Therefore, since the white print pixel signal 204 having a shorter width than the period of the line memory synchronization signal 104 is enlarged to the width of one period of the line memory synchronization signal 104 and is read in, the memory data 107 in the white enlarged line memory 105 stored through the flip-flop circuit 301 is enlarged in the white portion so as to be larger than the image in the print pixel signal 204. This is the reason why it is referred to as a white enlarged line memory 105. Each of the outputs from the latches 303 corresponds to a respective one of twenty-five elements A1 to E5 of the memory data 107 shown in FIG. 5, which are transmitted to image pattern detecting logic circuits 109 and 110 all at once.

Figure 4:
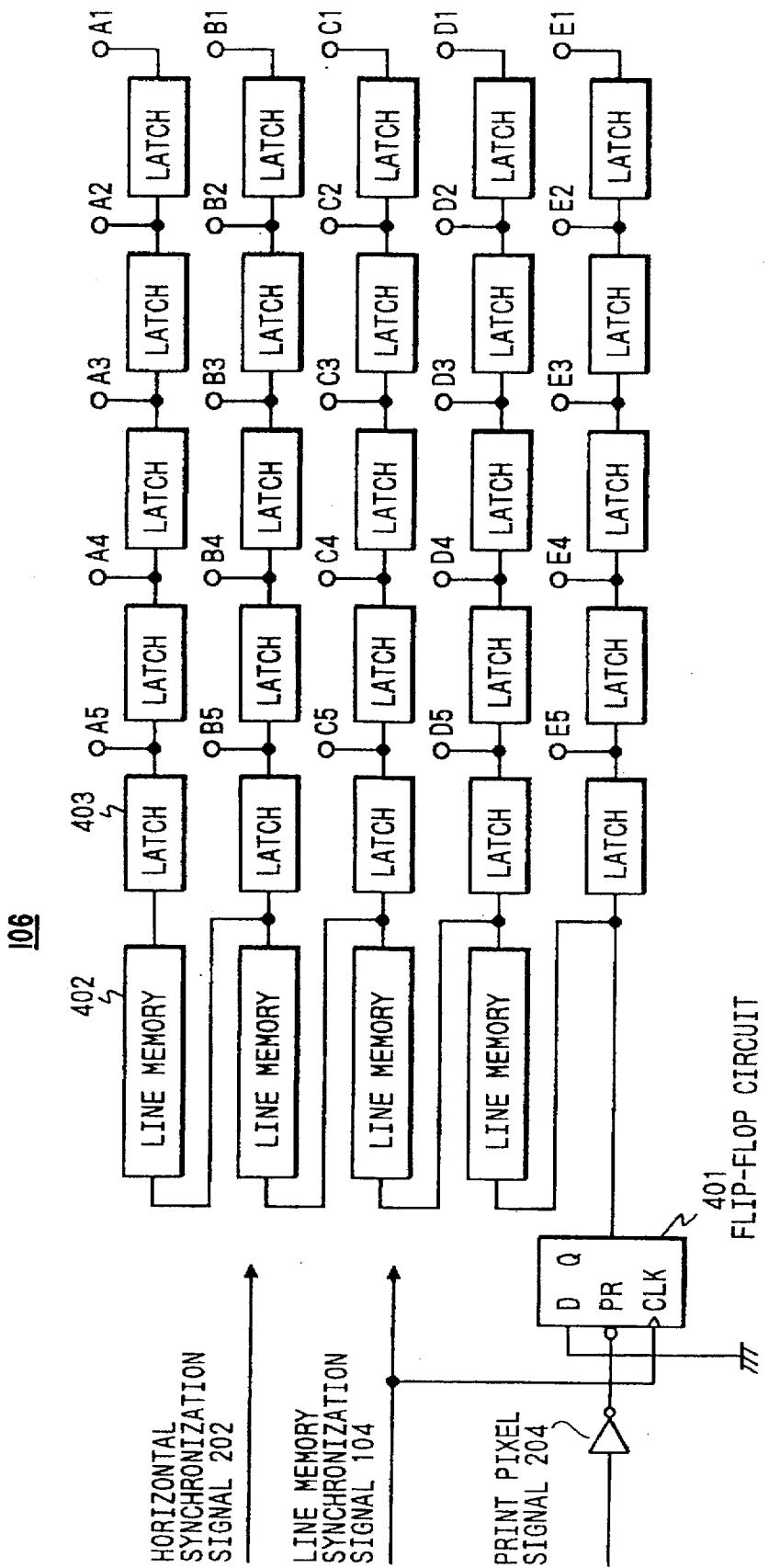
FIG. 4 is a schematic block diagram showing the structure of a black enlarged line memory in accordance with the present invention.

FIG. 4 shows the structure of the black enlarged line memory 106. This line memory according to the present invention is characterized by provision of a flip-flop circuit 401 ahead of a conventional line memory composed of a line memory 402 capable of storing four lines of data and twenty-five latches 403. The line memory 402 and the latches 403 read the print pixel signal 204 in synchronism with the line memory synchronization signal 104, that is, the signal 104 establishes the timing for reading-in. In a case of setting the resolution in the main (horizontal) direction for the print pixel signal 204 at a high resolution, when there is a black print pixel signal 204 shorter than the period of the line memory synchronization signal 104, sometimes the black print pixel signal cannot be stored in a conventional line memory. In a case where the printer 207 is controlled in such a way that an isolated single point is detected and the isolated single point is printed strong, when a short black print pixel signal 204 formed by a user is not stored in the line memory, the appropriate portion is not recognized as an isolated single point and is not printed strong. In this embodiment, no matter how short a black print pixel signal 204 is compared to the period of line memory synchronization signal 104, the black print pixel signal can be trapped, since the flip-flop circuit 401 is set to 1 by the black print pixel signal. When the next line memory synchronization signal 104 is received, the set state of 1 of the flip-flop circuit 401 is written in the black enlarged line memory 106. Therefore, since the black print pixel signal 204, having a shorter width than the period of the line memory synchronization signal 104, is enlarged to the width of one period of the line memory synchronization signal 104 and is read in, the memory data 108 in the black enlarged line memory 106 stored through the flip-flop circuit 401 is enlarged in the black portion so as to be larger than the image in the print pixel signal 204. This is the reason why it is referred to as a black enlarged line memory 106. Each of the outputs from the latches 403 corresponds to a respective one of twenty-five elements A1 to E5 of the memory data 108 shown in FIG. 5, which are transmitted to image pattern detecting logic circuits 111 and 112 all at once.

Figure 12:
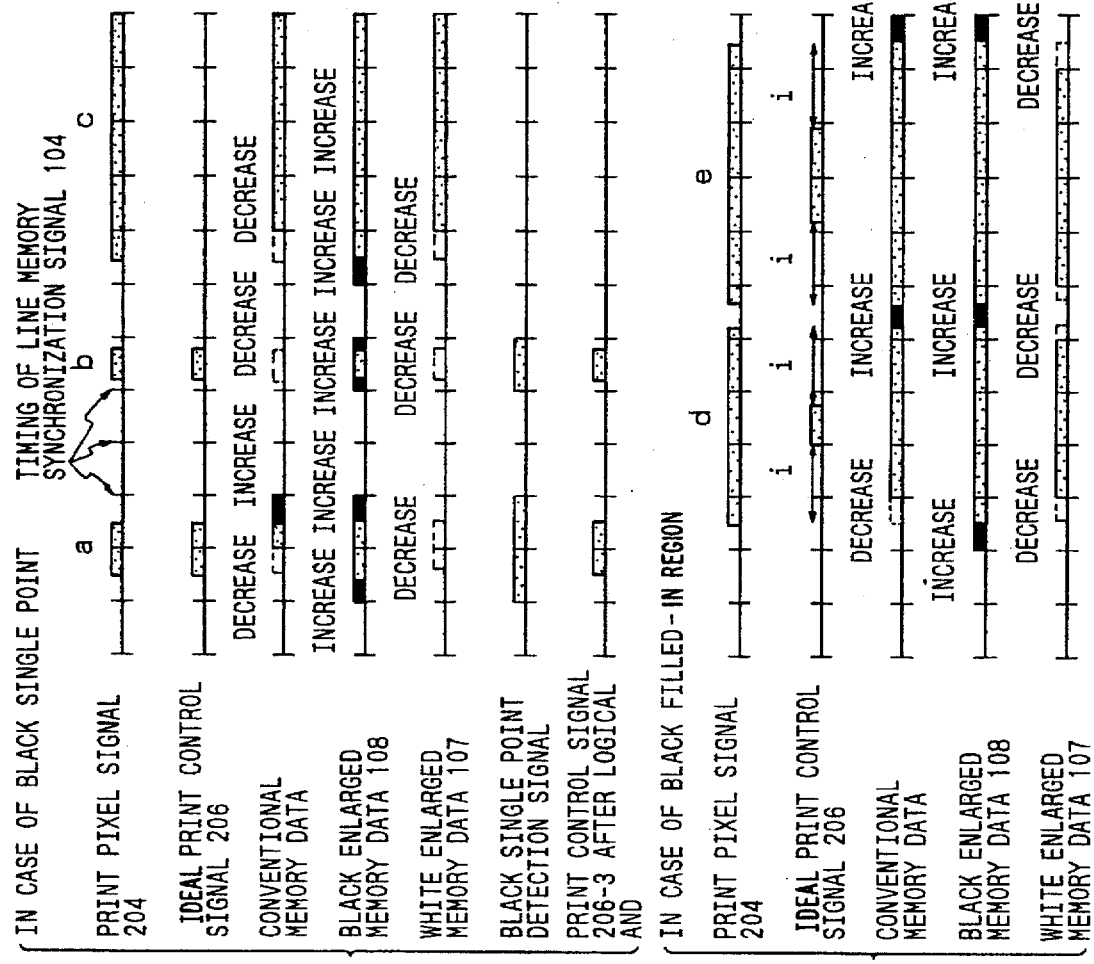
FIGS. 12(1) and 12(2) are timing diagrams for explaining the signals in the printer control system in accordance with the present invention.

FIG. 12(1) and FIG. 12(2) show changes of signals in the printer control system 205. FIG. 12(1) shows a case of a black single point image. The black signal a and the black signal b in the print pixel signal 204 correspond to black single points, and the black signal c corresponds to a black region. Since the print pixel signal 204 is of high resolution, each black signal starts at an arbitrary time and ends at an arbitrary time. That is, the timing of the print pixel signal 204 is independent of the timing of the line memory synchronization signal 104. Therefore, it would be ideal if the print control signal 206 for enhancing a black single point were obtained in such a way that the print control signals 206 for the black signal a and the black signal b have precisely the shapes shown in FIG. 12(1). When the print pixel signal 204 is stored with the timing of the line memory synchronization signal 104 using a conventional line memory, the width of the stored data is increased or decreased as shown in FIG. 12(1). A change in the width or position is determined by the positional relation between the black signal and the line memory synchronization signal 104 and is irregular. On the other hand, when the print pixel signal 204 is stored in the black enlarged line memory 106 and the white enlarged line memory 105 in the embodiment, the memory data 108 stored in the black enlarged line memory 106 is increased within one element of memory data on both sides at maximum in any case; and, on the contrary, no memory data 107 is stored in the white enlarged line memory 105, so that the data is decreased insofar as the white enlarged line memory 105 is concerned.

FIG. 12(2) shows a case of a black filled-in region. The black signal d and the black signal e in the print pixel signal 204 correspond to black filled-in regions. Since only an inside portion of a black filled-in region is to be enhanced, it Would be ideal if the print control signal 206 for enhancing a black filled-in region were obtained in such a way that only a signal inside each black signal between two points spaced a certain distance (i) from both edges of the signal d or the signal e, as shown in the figure, were obtained. The memory data 107 and 108 stored in each of the line memories 105 and 106 is changed in the same manner as described above. Although the memory data 107 or 108 stored in the line memory 105 or 106 according to the embodiment of the invention will lose its positional information in a high resolution due to lowering of the resolution, the width of the memory data is either increased or decreased.

The image pattern detecting logic circuits 109 to 112 will be described below, referring to FIG. 1. The image pattern detecting logic circuits 109 and 110 or 111 and 112 receive the twenty-five elements A1 to E5 of the memory data 107 or 108 from each of the line memories 105 or 106 shown in FIG. 5 all at once. In the embodiment, the data E3 is assumed to be a reference memory data element 501 for use as an object of judging. Judging is performed to determine what kind of image pattern the reference memory data element 501 is part of, and the print control signals 206-1 to 206-4 are generated based on a result of the judging.

In the embodiment, among the image patterns effective for print characteristic correction of the printer 207, four kinds of image pattern detecting logic circuits of a type frequently used will be described below.

(1) The image pattern detecting logic circuit 109 is a white single point and thin line detecting logic circuit 109 which corrects the condition where a white single point or a white thin line written inside a black filled-in region is hardly visible, this phenomenon being often observed in, for example, a normal development laser printer, by increasing the laser power or increasing the diameter of the beam spot using the print control signal 206-1. However, it is necessary to correct the width of the print control signal 206-1, as will be described later.

(2) The image pattern detecting logic circuit 110 is a black filled-in region detecting logic circuit 110 which corrects the condition where the image quality is degraded by appearance of inconsistencies in density inside a black filled-in region, this phenomenon being often observed in, for example, an inverse development laser printer, by increasing the laser power or increasing the diameter of the beam spot using the print control signal 206-2.

(3) The image pattern detecting logic circuit 111 is a black single point and thin line detecting logic circuit 111 which corrects the condition where a black single point or a black thin line is hardly visible, this phenomenon being often observed in, for example, an inverse development laser printer, by increasing the laser power or increasing the diameter of the beam spot using the print control signal 206-3. However, it is necessary to correct the width of the print control signal 206-3, as will be described later.

(4) The image pattern detecting logic circuit 112 is a white filled-in region detecting logic circuit 112 which corrects the condition where the image quality is degraded by appearance of inconsistencies in density on a white background, this phenomenon being often observed in, for example, a normal development laser printer, by increasing the laser power or increasing the diameter of the beam spot using the print control signal 206-4.

Figure 5:
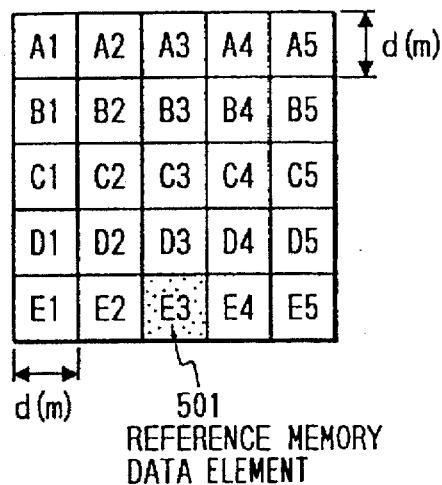
FIG. 5 is a diagram showing the position of memory data for an image.
Figure 6A:
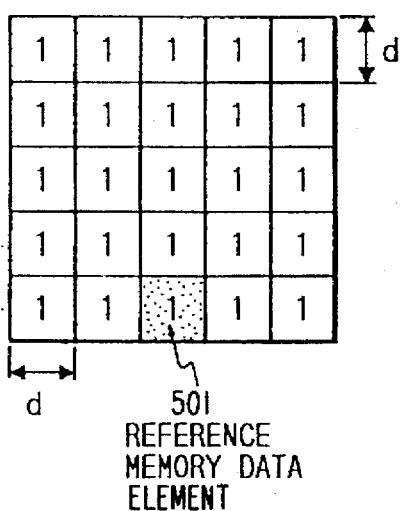
FIGS. 6(a) and 6(b) are diagrams showing the logic for detecting a black filled-in region in accordance with the present invention.
Figure 6B:
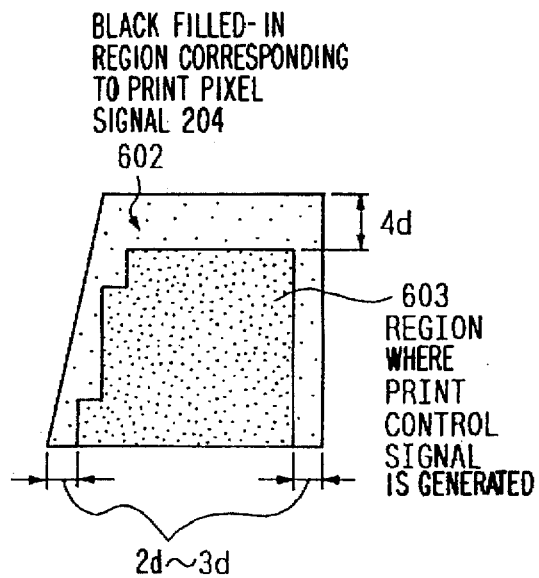
Figure 7:
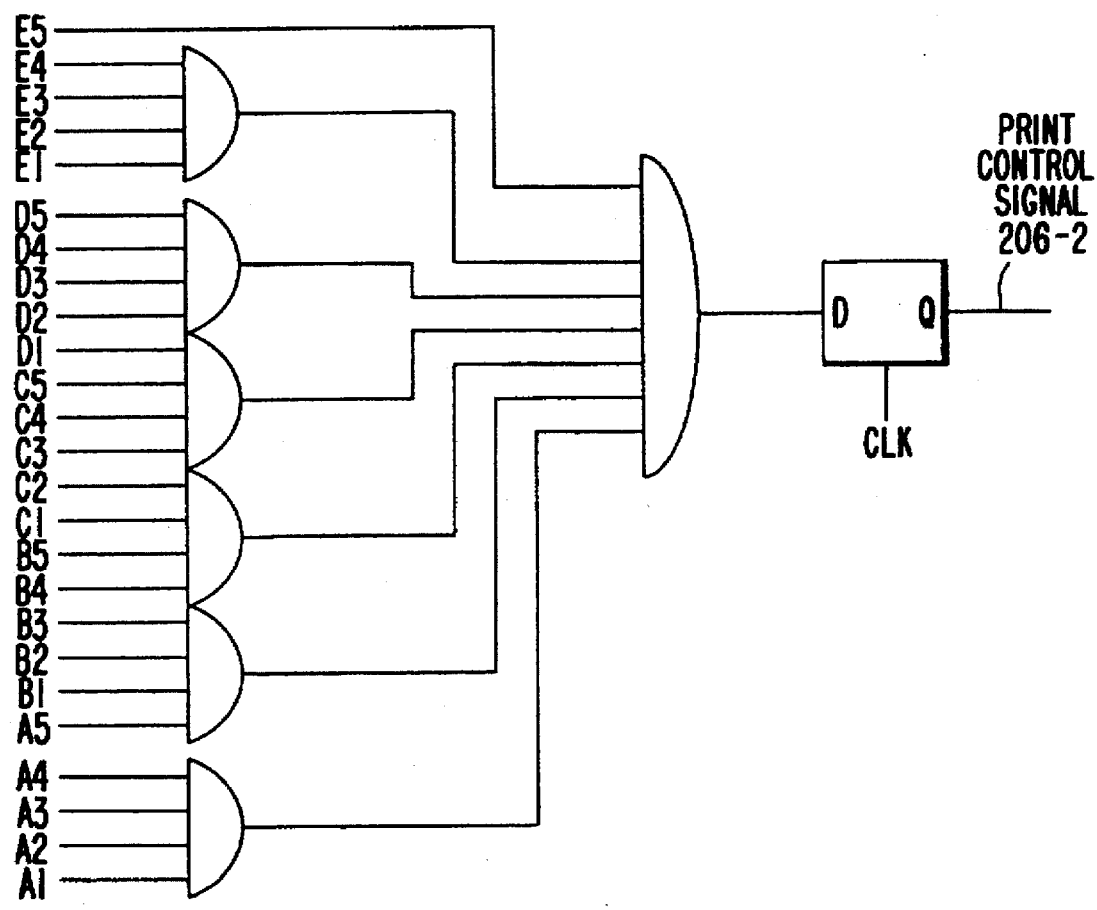
FIG. 7 is a schematic circuit diagram showing a black filled-in region detecting circuit in accordance with the present invention.
Figure 8:
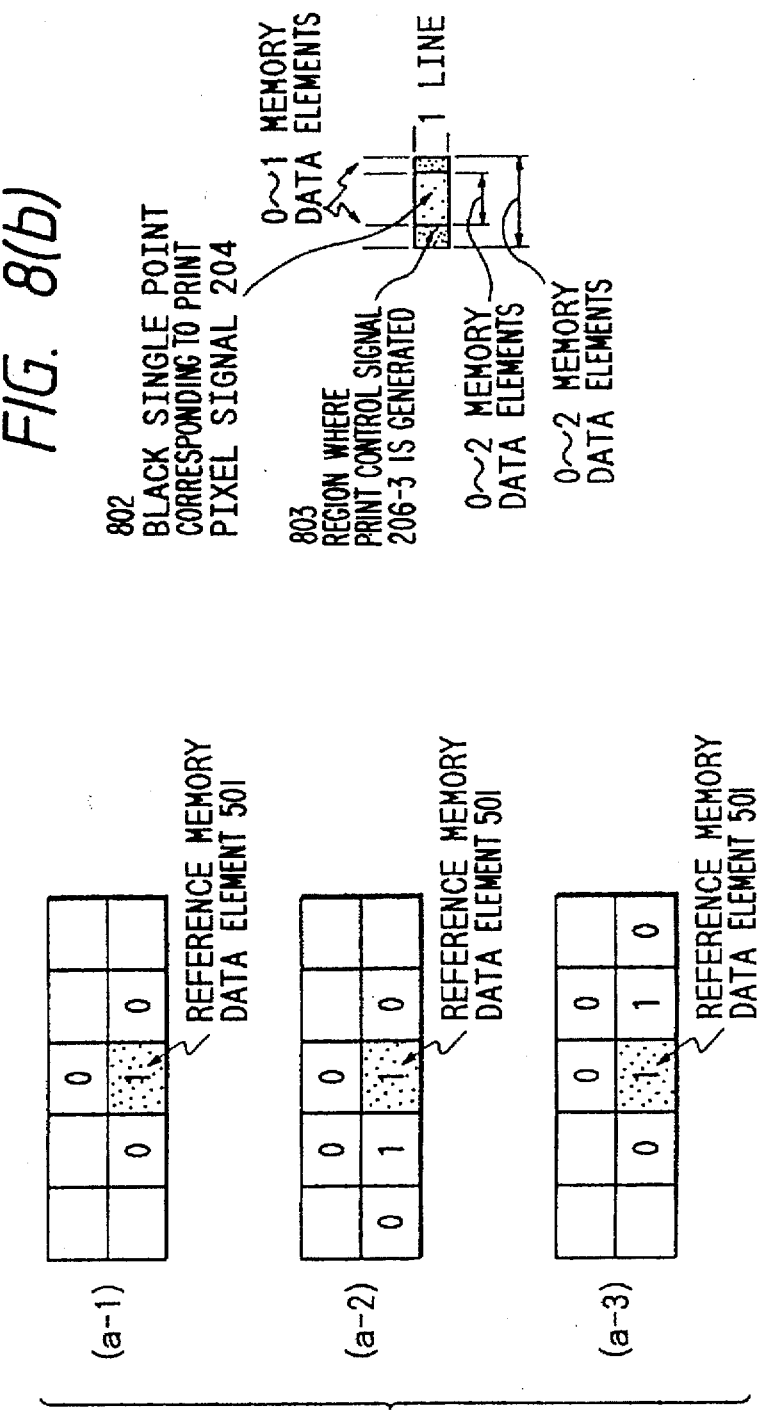
FIGS. 8(a) and 8(b) are diagrams showing the logic for detecting a black single point in accordance with the present invention.
Figure 9:
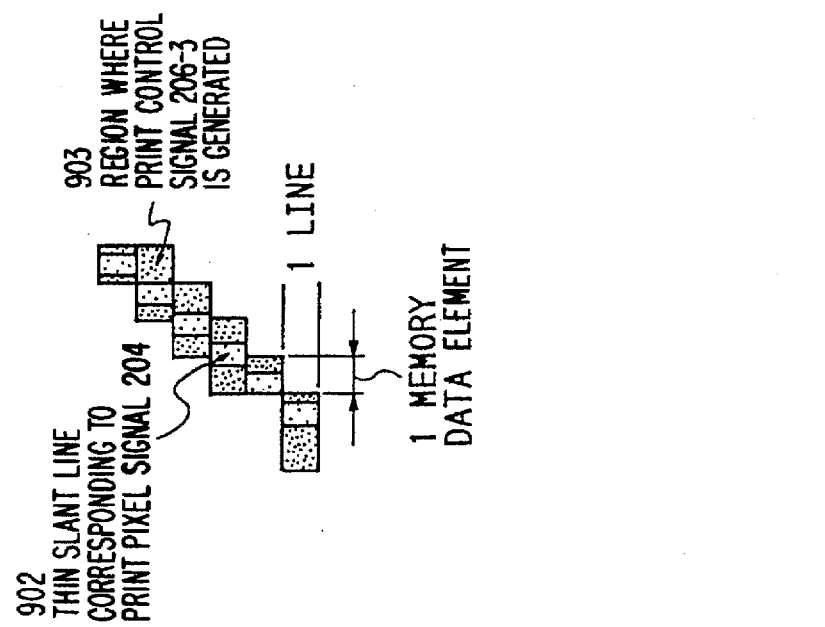
FIGS. 9(a) and 9(b) are diagrams showing the logic for detecting a slant line in accordance with the present invention.

The image pattern detecting logic circuits 109 to 112 described above can be implemented using a well-known image processing technique (template matching). FIG. 6(a) shows a template for detection wherein reference memory data element 501 is the same as that shown in FIG. 5, and FIG. 6(b) shows a region to be detected by the black filled-in region detecting logic circuit 110. When each of the twenty-five elements A1 to E5 of the memory data 107 shown in FIG. 5 agrees with each of the values of the template shown in FIG. 6(a), the reference memory data element 501 is judged to be part of a black filled-in region and the print control signal 206-2 is generated. The region 603 where the print control signal 206-2 is generated is inside the black filled-in region 602 corresponding to the print pixel signal 204 as shown in FIG. 6(b). The region is inside by 2d to 3d (m). In this embodiment, the reason why both widths in the lateral direction do not agree is because the outer region 602 corresponds to the high resolution print pixel signal 204 and, on the other hand, the inner region 603 corresponds to the low resolution print control signal 206-2 generated based on the low resolution white enlarged line memory data 107. However, the periphery, commonly having a width of 5d (m), of the black filled-in region to be enhanced is generally printed at a high density due to the edge effect of the electric field. Therefore, in actuality, jitter and moire due to sampling error do not appear in the printed image. FIG. 7 shows a specific embodiment of a logic circuit foe template matching. Although a look-up table or an IC for calculation may be used for the logic circuit, the embodiment employs a TTL logic circuit since the number of kinds of image regions is small. That is, the input memory data A1 to A5, B1 to B5, C1 to C5, D1 to D5, E1 to E5 for the pixels is passed through a logic circuit having the structure shown in FIG. 7, and then a pattern matched result is output.

FIG. 8(a) shows a template for detection wherein reference memory data element 501 is the same as that shown in FIG. 5, and FIG. 8(b) shows a region to be detected by the black single point and thin line detecting logic circuit 111. Although the actual size of the template is the same 5-by-5 size as that of the template shown in FIG. 8(a), an abbreviated template is illustrated in FIG. 8(a) since explanation can be made regardless of the values in the unillustrated part of the template. When the memory data elements among the twenty-five elements A1 to E5 of the memory data 108 shown in FIG. 5 corresponding to the positions in the template shown in FIG. 8(a) having values of 1 or 0 agree with each of the values of the template shown in FIG. 8(a), the reference memory data element 501 is judged to be part of a black single point and the print control signal 206-3 is generated. The memory data elements in the positions corresponding to the positions in the template having no value are disregarded. The template shown in FIG. 8(a) at (a-1) indicates a case where a black single point of the print pixel signal 204 having a width narrower than the interval (d) of black enlarged line memory data 108 is inside the boundary of a memory data element of black enlarged line memory data 108, and the black single point can be recognized by the template since it is stored as one memory data element in the black enlarged line memory 106. On the other hand, the templates shown in FIG. 8(a) at (a-2) and (a-3) indicate a case where the black single point crosses the boundary of a memory data element of black enlarged line memory data 108, and the black single point can be recognized by the template since it is stored as two memory data elements in the black enlarged line memory 106. Therefore, the region 803 where the print control signal 206-3 is generated is outside the black single point 802 corresponding to the print pixel signal 204 as shown in FIG. 8(b). The region is outside by 0d to 1d (m).

FIG. 9(a) and FIG. 9(b) are concerned with thin slant line detecting logic. The logic indicates a case of using a template to enhance a thin slant line extending at an angle of 45 degrees where the width of the thin slant line is apt to be unstable. Although FIG. 9(b) shows a case of a thin slant line extending toward the upper right, it becomes a case of a thin slant line extending toward the upper left by reversing the template right to left. In this embodiment, the width of the detected thin slant line, that is, the region 903 where the print control signal 206-3 is generated, is outside the thin slant line 902 corresponding to the print pixel signal 204 as shown in FIG. 9(b). The region is outside by 0d to 1d (m).

Figure 10:
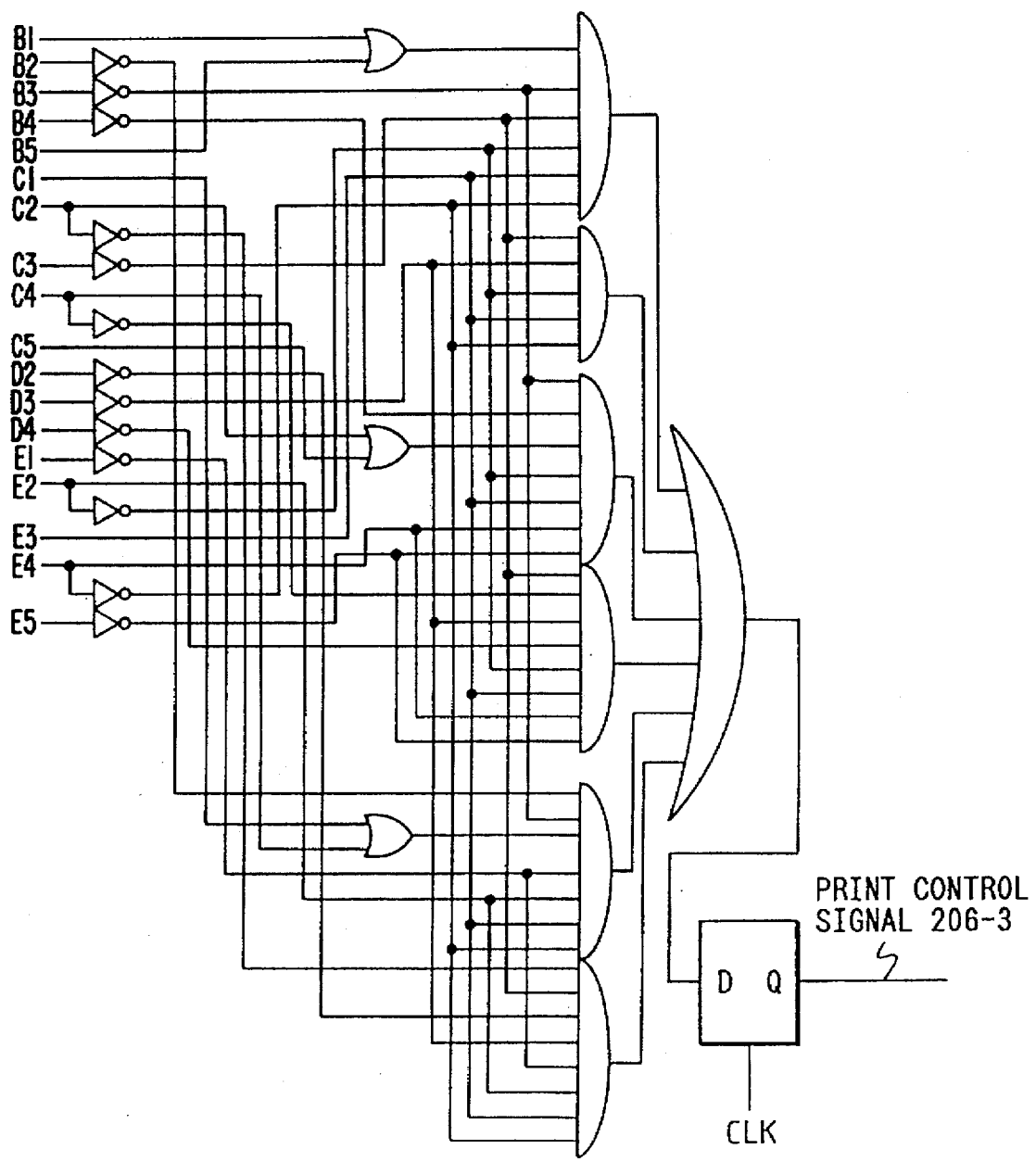
FIG. 10 is a schematic circuit diagram showing a black single point and slant line detecting circuit in accordance with the present invention.
Figure 11A:
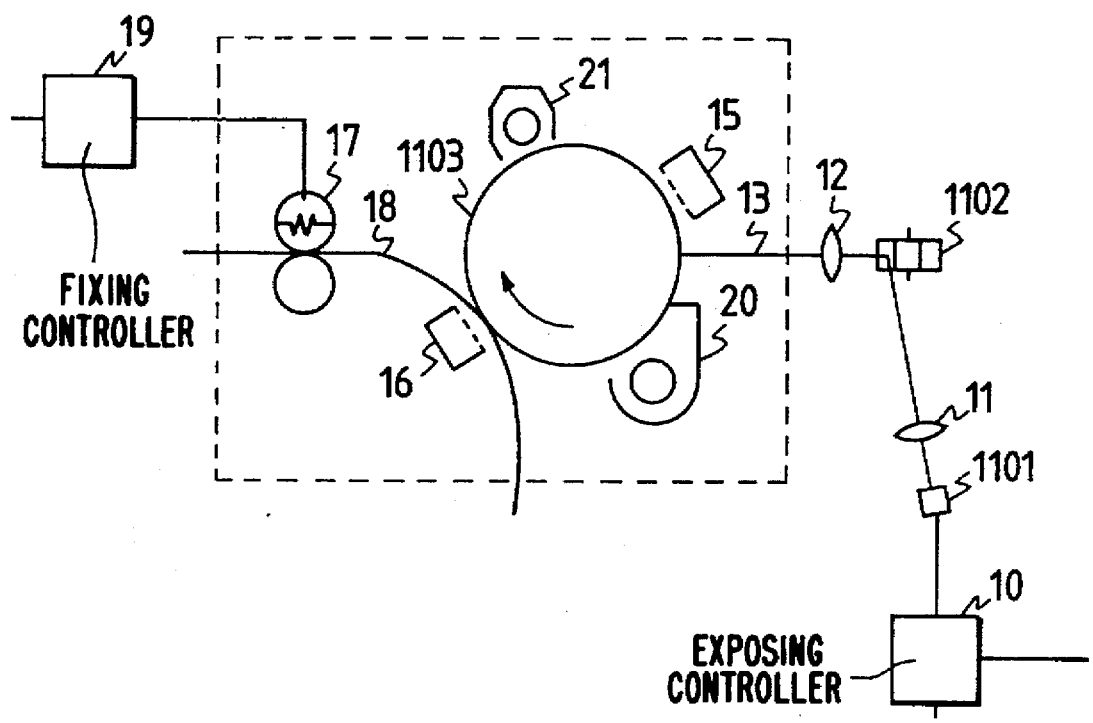
FIGS. 11(a) and 11(b) are schematic diagrams showing the structure of a laser printer in accordance with the present invention.
Figure 11B:
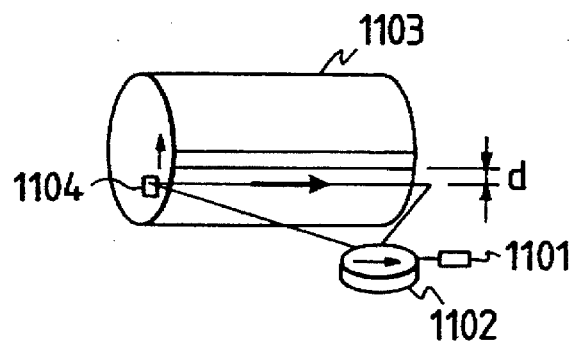

FIG. 10 shows a specific embodiment of a logic circuit for template matching in a case of combining the templates in FIG. 8(a) and FIG. 9(a). Since an image region other than the region described above can be detected by changing the template, an image region detection suitable for the printer 207 is possible.

As shown in FIG. 8(b) and FIG. 9(b), the print control signal 206-3 is wider than the print pixel signal 204 for the image to be enhanced by one memory data element at maximum in the lateral direction. Therefore, if the image is enhanced with the print control signal 206-3 as it is, jitter and moire as described above appear in the output image. However, since the print control signal 206-3 in this embodiment is generated by the black enlarged line memory 106, the print control signal always becomes larger than the print pixel signal 204 representing the original image. Therefore, the above problem can be solved by taking the logical product of the print control signal 206-3 and the print pixel signal 204, matched in timing by using a delay element 113, with an AND gate 115 as shown in FIG. 1, and enhancing the image using the output as a new print control signal 206-3. Here, since the print control signal 206-3 is delayed from the print pixel signal 204 by a certain time (the delay time depends on the template and the logic circuit used) due to the image pattern detecting logic circuits 109 to 112, the delay element 113 for delaying the print pixel signal 204 by the certain time is required to compensate for the delay time. The delay element 113 is a well-known element using a delay line in which the print pixel signal 204 having a high resolution is delayed without degrading the resolution.

The print control signal will be further described below, referring to FIG. 12(1). When a black single point is detected from the black enlarged line memory data 108, the black single point detection signal is detected as two memory data elements if the signal a is across the boundary, is detected as one memory data element if the signal b is inside the boundary, and is not detected if the signal c is not a black single point. Since the black single point detection signal has a wider width than the original signal a or b, a print control signal 206-3 which is the same as the ideal print control signal 206 described above can be obtained by obtaining a logical product of the black single point detection signal and the print pixel signal 204 with AND gate 115 as shown in FIG. 1.

Concerning the enhanced signal from the white single point and thin line detecting logic circuit 109, a print control signal 206-1 effective for the normal development printer described above can be obtained by obtaining a logical sum of the white single point detection signal and the print pixel signal 204 with an OR gate 114 as shown in FIG. 1.

Figure 13:
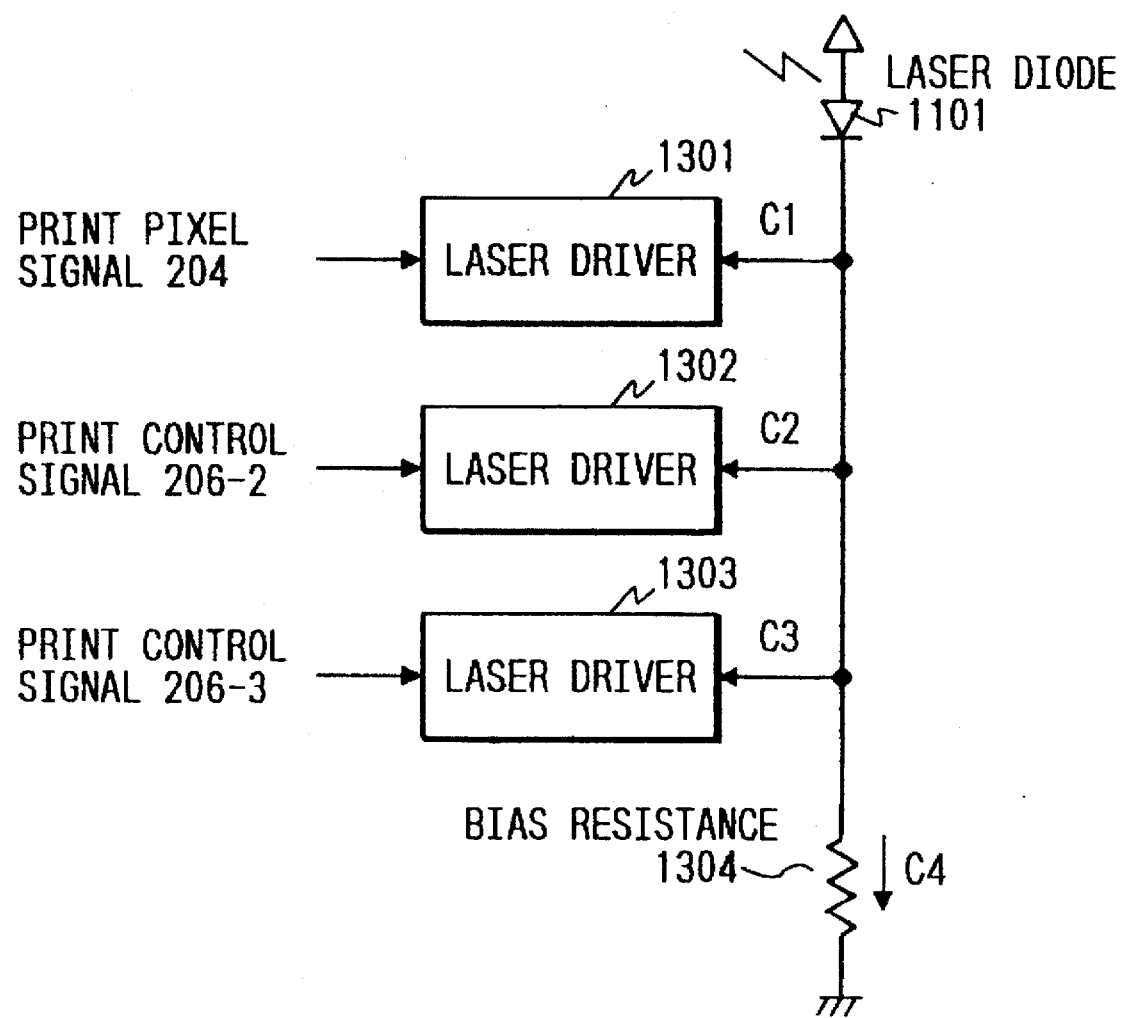
FIG. 13 is a schematic block diagram showing a laser diode drive circuit in accordance with the present invention.
Figure 14:
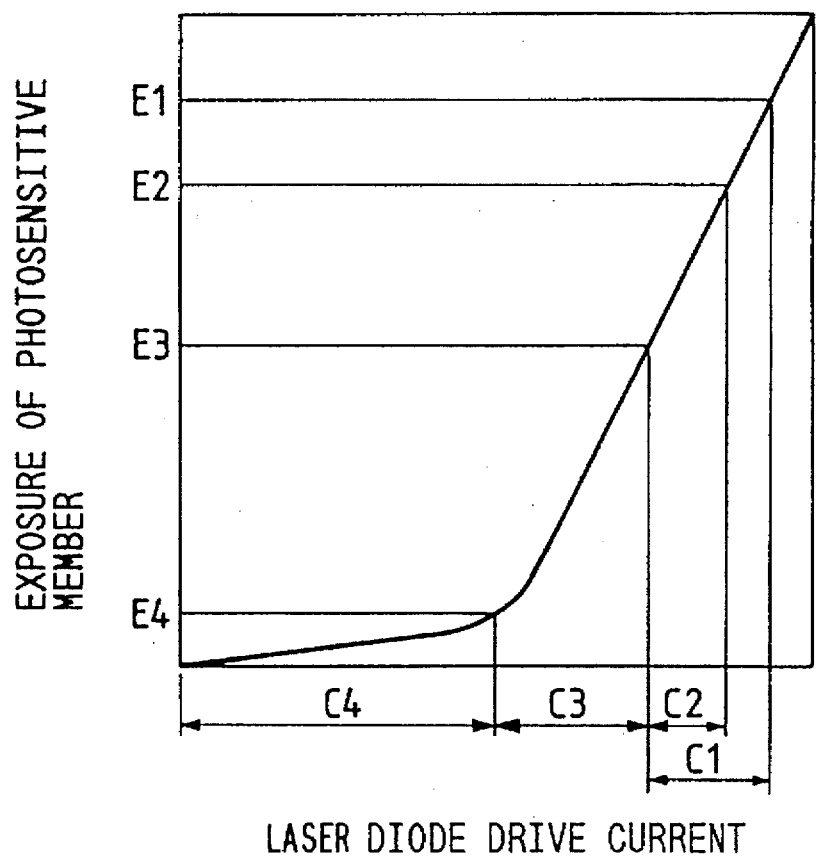
FIG. 14 is a graph showing the general characteristic of a laser diode.

Finally, the method of utilizing the print control signal 206 obtained in the embodiment will be described. FIG. 13 shows a case where the print control signal 206 is applied to control or modulate the laser light producing power in a laser diode 1101. A delayed print pixel signal 204 is input to a laser driver 1301, and the print control signals 206-2 and 206-3 are input to laser drivers 1302 and 1303. When the input is 1, each of the laser drivers 1301 to 1303 passes current of C1 to C3. A bias resistance 1304 passes current of C4. Consequently, the laser diode drive current corresponding to each of the image patterns becomes that shown in Table 1, and optimum exposures E1 to E4 of the photosensitive member for each of image patterns are realized using a general characteristic of the laser diode shown in FIG. 14.

TABLE 1

Relation between Image Pattern and Laser Diode Drive Current

| IMAGE PATTERN | LASER DIODE DRIVE CURRENT | OPTIMUM EXPOSURE OF PHOTOSENSITIVE MEMBER |
|---|---|---|
| BLACK FILLED-IN REGION | C1 + C3 + C4 | E1 |
| BLACK SINGLE POINT | C2 + C3 + C4 | E2 |
| BLACK PIXEL OTHER THAN ABOVE | C3 + C4 | E3 |
| WHITE REGION | C4 | E4 |

A normal development printer, where the ON/OFF operation of the laser and the white/black state of a pixel to be printed are inverted, can easily be realized by using the print control signals 206-4 and 206-1 instead of using the print control signals 206-2 and 206-3. Concerning enhancing means, the present invention can be easily applied to a system employing laser light producing time modulation, or a system employing laser spot diameter or laser spot shape modulation, other than the embodiment which employs laser light producing power modulation.

Figure 15:
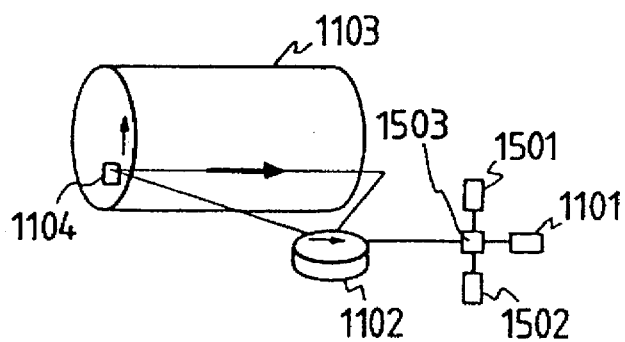
FIG. 15 is a diagrammatic view showing the structure of a laser printer.
Figure 16:
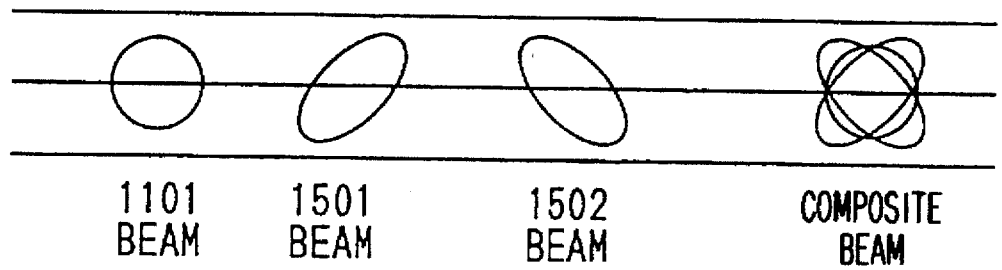
FIG. 16 is a diagram showing shapes of spots.
Figure 17:
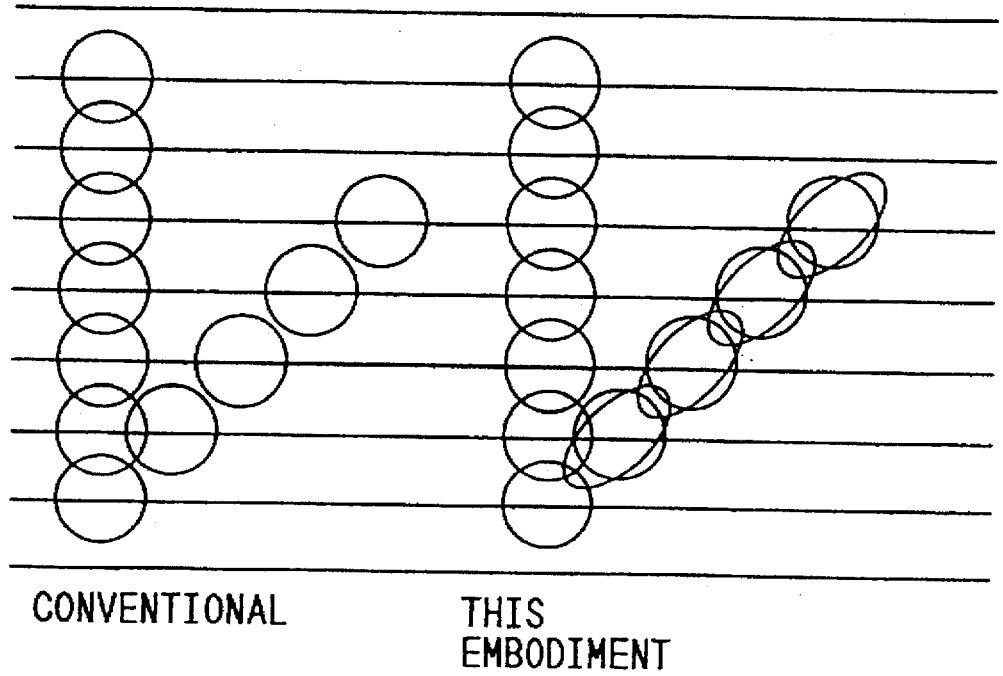
FIG. 17 is a diagram showing examples of character printing.

An embodiment employing laser spot shape modulation will be described below, referring to FIG. 15 to FIG. 17. FIG. 15 shows the structure of the embodiment. Two lasers 1501 and 1502 are provided in addition to a conventional laser 1101, and the beams of the three lasers are combined on a single optical axis with a coupling lens 1503. FIG. 16 shows the spot shapes of the three laser beams on the photosensitive member 1103. The shape of the laser beam from the laser 1501 is an upper-right directed oval, the shape of the laser beam from the laser 1502 is an upper-left directed oval, and the three beams can be concentrated to one point to form a complex beam. FIG. 17 shows an example of printing. The upper-right directed portion in the printing pattern can be detected with the slant line detecting logic shown in FIG. 9(a). If the laser 1501 is driven with a print control signal representing the logical product of the detection signal and the print pixel signal, the result shown in FIG. 17 can be obtained and a stable slant line can be printed. Concerning laser spot shapes other than the above, there is a combination of large and small spots where a black single point is printed with the small spot and a black filled-in region is printed with the large spot. In this case, the black single point can be printed clearly, and the black filled-in region can be printed without inconsistencies in density.

Figure 18:
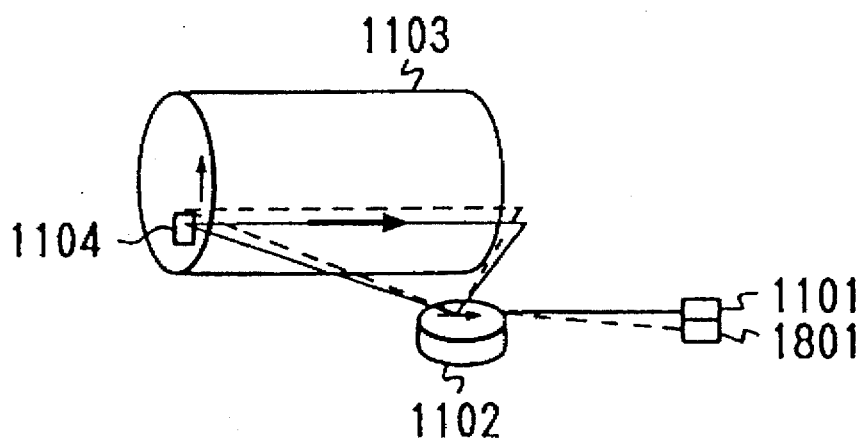
FIG. 18 is a diagrammatic view showing the structure of a laser printer.
Figure 19:
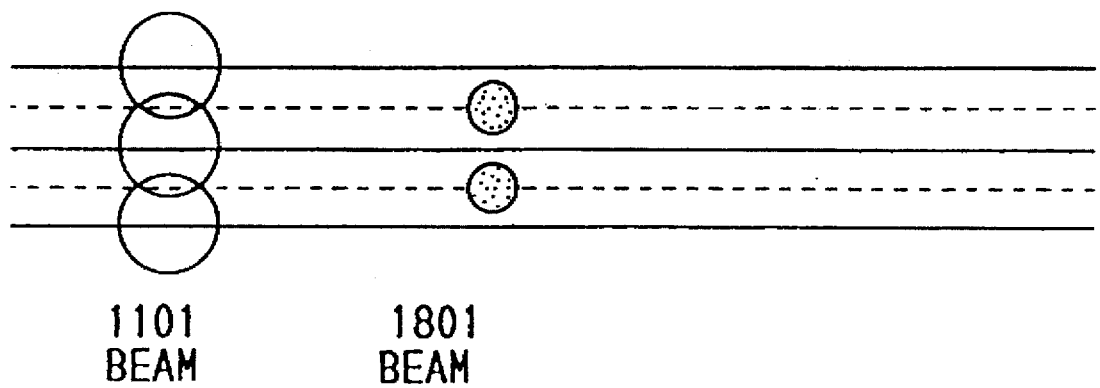
FIG. 19 is a diagram showing shapes of spots.
Figure 20:
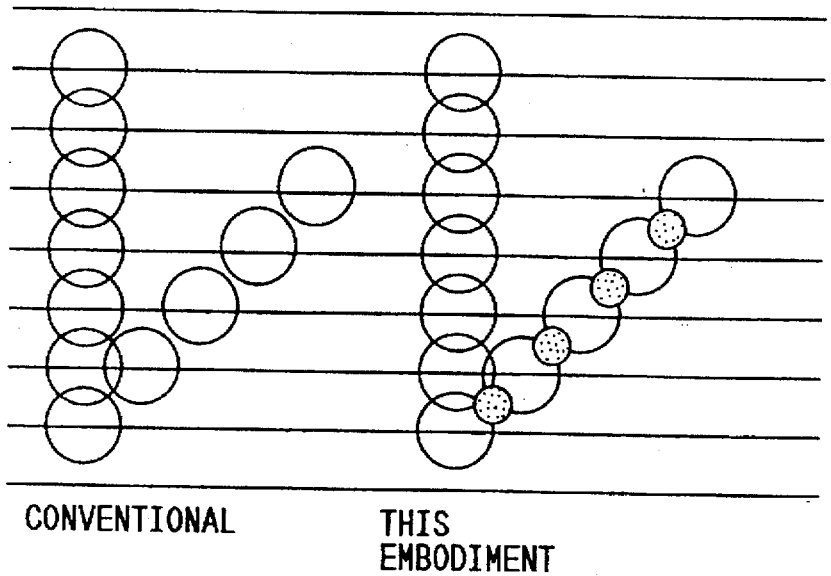
FIG. 20 is a diagram showing examples of character printing.
Figure 21:
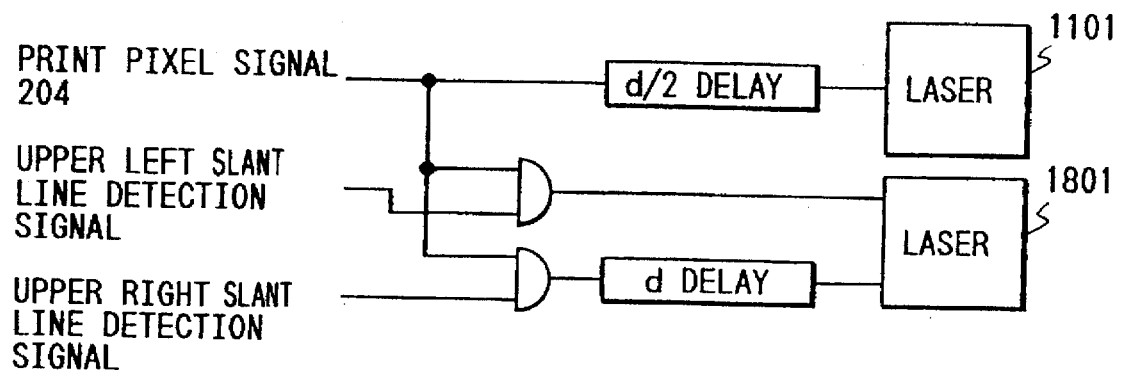
FIG. 21 is a schematic block diagram showing the structure of a delay element.

An embodiment involving shifting scanning beams will be described below, referring to FIGS. 18 to 20. FIG. 18 shows the structure of the embodiment. A laser 1801 is provided in addition to a conventional laser 1101, the laser 1801 being shifted from the laser 1101 by a minute distance, upward by one-half of scanning pitch of the laser 1101 on the photosensitive member 1103. FIG. 19 shows the spot shape of the two laser beams on the photosensitive member 1103. The beam diameter of the laser 1801 is a fine spot which is one-half that of the laser 1101. FIG. 20 shows an example of printing. The upper-right directed portion in the printing pattern can be detected with the slant line detecting logic shown in FIG. 9(a). The laser 1801 is driven with a print control signal representing the logical product of the detection signal and the print pixel signal. At this time, the laser 1801 has to be driven with a delay of one-half dot when the line is directed toward the upper right as illustrated in FIG. 20, and, on the other hand, has to be driven with an advance of one-half dot when the line is directed toward the upper left. FIG. 21 shows the structure of a delay element. When the delay element is designed as shown in FIG. 21, the result shown in FIG. 20 can be obtained and a stable slant line can be printed.

According to the present invention, in a printer in which a user can voluntarily set the resolution of the print pixel signal to be supplied to the printer having a high resolution, a high quality image output can be obtained by using a small capacity and slow speed memory, since image processing for correcting the printer can be realized with a necessary and sufficient memory structure.

What is claimed is:

1. A printer control system for controlling a print characteristic of a printer for printing a print pixel signal synchronized to horizontal lines of an image, the print pixel signal having an arbitrary horizontal resolution and including white print pixel signals representing white pixels of the image and black print pixel signals representing black pixels of the image, the printer control system controlling the print characteristic of the printer in accordance with a type of the image and comprising:

a white enlarged line memory for receiving the print pixel signal and storing the print pixel signal at timing points spaced a predetermined time apart after expanding any portion of any white print pixel signal in the print pixel signal falling between two adjacent ones of the timing points and having a duration less than the predetermined time to have a duration equal to the predetermined time without expanding any portion of any black print pixel signal in the print pixel signal; and a black enlarged line memory for receiving the print pixel signal and storing the print pixel signal at timing points spaced a predetermined time apart after expanding any portion of any black print pixel signal in the print pixel signal falling between two adjacent ones of the timing points and having a duration less than the predetermined time to have a duration equal to the predetermined time without expanding any portion of any white print pixel signal in the print pixel signal.

2. A printer control system according to claim 1, further comprising means for generating a line memory synchronization signal defining the timing points spaced the predetermined time apart;

wherein the white enlarged line memory includes means for receiving the print pixel signal, holding any portion of any white print pixel signal in the print pixel signal falling after one of the timing points until a next one of the timing points without holding any portion of any black print pixel signal in the print pixel signal to produce a first held print pixel signal, thereby expanding any portion of any white print pixel signal in the print pixel signal falling between two adjacent ones of the timing points and having a duration less than the predetermined time to have a duration equal to the predetermined time without expanding any portion of any black print pixel signal in the print pixel signal, and storing the first held print pixel signal in response to the line memory synchronization signal; and wherein the black enlarged line memory includes means for receiving the print pixel signal, holding any portion of any black print pixel signal in the print pixel signal falling after one of the timing points until a next one of the timing points without holding any white print pixel signal in the print pixel signal to produce a second held print pixel signal, thereby expanding any portion of any black print pixel signal in the print pixel signal falling between two adjacent ones of the timing points and having a duration less than the predetermined time to have a duration equal to the predetermined time without expanding any portion of any white print pixel signal in the print pixel signal, and storing the second held print pixel signal in response to the line memory synchronization signal.

3. A printer control system according to claim 1, further comprising:

means for detecting at least one of a single point, a thin line, and a filled-in region in the image based on at least one of the print pixel signal stored in the white enlarged line memory and the print pixel signal stored in the black enlarged line memory, and outputting a detection signal in accordance with a result of the detection; and means for generating a print control signal for controlling the print characteristic of the printer based on the detection signal.

4. An information printing system comprising:

a computer for generating a print pixel signal synchronized to horizontal lines of an image, the print pixel signal having an arbitrary horizontal resolution and including white print pixel signals representing white pixels of the image and black print pixel signals representing black pixels of the image;

a printer for printing the print pixel signal, the printer having a controllable print characteristic and including a photosensitive member, exposing means for exposing the photosensitive member in accordance with the print pixel signal to produce a latent image on the photosensitive member, the exposing means being responsive to a print control signal for controlling the print characteristic of the printer, developing means for developing the latent image on the photosensitive member with toner to produce a toner image on the photosensitive member, transferring means for transferring the toner image from the photosensitive member to a print medium, and fixing means for fixing the transferred toner image on the print medium; and printer control means for controlling the print characteristic of the printer, the printer control means including a white enlarged line memory for receiving the print pixel signal and storing the print pixel signal at timing points spaced a predetermined time apart after expanding any portion of any white print pixel signal in the print pixel signal falling between two adjacent ones of the timing points and having a duration less than the predetermined time to have a duration equal to the predetermined time without expanding any portion of any black print pixel signal in the print pixel signal, a black enlarged line memory for receiving the print pixel signal and storing the print pixel signal at timing points spaced a predetermined time apart after expanding any portion of any black print pixel signal in the print pixel signal falling between two adjacent ones of the timing points and having a duration less than the predetermined time to have a duration equal to the predetermined time without expanding any portion of any white print pixel signal in the print pixel signal, means for detecting at least one of a single point, a thin line, and a filled-in region in the image based on at least one of the print pixel signal stored in the white enlarged line memory and the print pixel signal stored in the black enlarged line memory, and outputting a detection signal in accordance with a result of the detection, and means for generating the print control signal for controlling the print characteristic of the printer based on the detection signal.

5. An information printing system according to claim 4, wherein the exposing means includes:

a laser for producing light in accordance with the print pixel signal; and means for modulating one of a light producing power and a light producing time of the laser in response to the print control signal.

6. An information printing system according to claim 4, wherein the exposing means includes:

a laser for producing light in accordance with the print pixel signal; and means for modulating a spot shape of the light produced by the laser in response to the print control signal.

7. An information printing system according to claim 4, wherein the exposing means includes:

a laser for producing light in accordance with the print pixel signal; and means for shifting a spot position of the light produced by the laser in response to the print control signal.

* * * * *